US009857959B2

(12) United States Patent
Dhawal

(10) Patent No.: US 9,857,959 B2
(45) Date of Patent: Jan. 2, 2018

(54) SUPPORTING WEBPAGE DESIGN AND REVISION IRRESPECTIVE OF WEBPAGE FRAMEWORK

(71) Applicant: Adobe Systems Incorporated, San Jose, CA (US)

(72) Inventor: Vickramaditya Dhawal, Karnataka (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 37 days.

(21) Appl. No.: 14/809,716

(22) Filed: Jul. 27, 2015

(65) Prior Publication Data
US 2017/0031574 A1 Feb. 2, 2017

(51) Int. Cl.
G06F 17/00 (2006.01)
G06F 3/0484 (2013.01)
G06F 17/24 (2006.01)
G06F 17/22 (2006.01)

(52) U.S. Cl.
CPC ...... *G06F 3/04847* (2013.01); *G06F 17/2247* (2013.01); *G06F 17/248* (2013.01)

(58) Field of Classification Search
CPC . G06F 3/04847; G06F 17/2247; G06F 17/248
See application file for complete search history.

(56) References Cited

U.S. PATENT DOCUMENTS

| 8,482,576 | B1* | 7/2013 | Yelsey ...... G06N 5/02 345/581 |
| 2008/0109472 | A1* | 5/2008 | Underwood ...... G06F 17/3089 |
| 2011/0107266 | A1* | 5/2011 | Hegde ...... G06F 8/38 715/841 |

* cited by examiner

*Primary Examiner* — Stephen Hong
*Assistant Examiner* — Marshon Robinson
(74) *Attorney, Agent, or Firm* — Keller Jolley Preece

(57) ABSTRACT

The present disclosure is directed to providing a webpage design system that facilitates a simple and unified user-experience for users modifying responsive webpages. In general, the webpage design system provides an agnostic framework that allows a user to modify a responsive webpage irrespective of the responsive framework used to create the responsive webpage. For example, the webpage design system can translate one or more responsive frameworks into an agnostic framework. Further, the webpage design system can load a responsive webpage and correlate elements in the responsive webpage with operations of the agnostic framework. Upon correlating the elements with agnostic framework operations, the webpage design system can provide agnostic framework operations to a user when the webpage design system detects that a user selects an element from the responsive webpage.

20 Claims, 11 Drawing Sheets

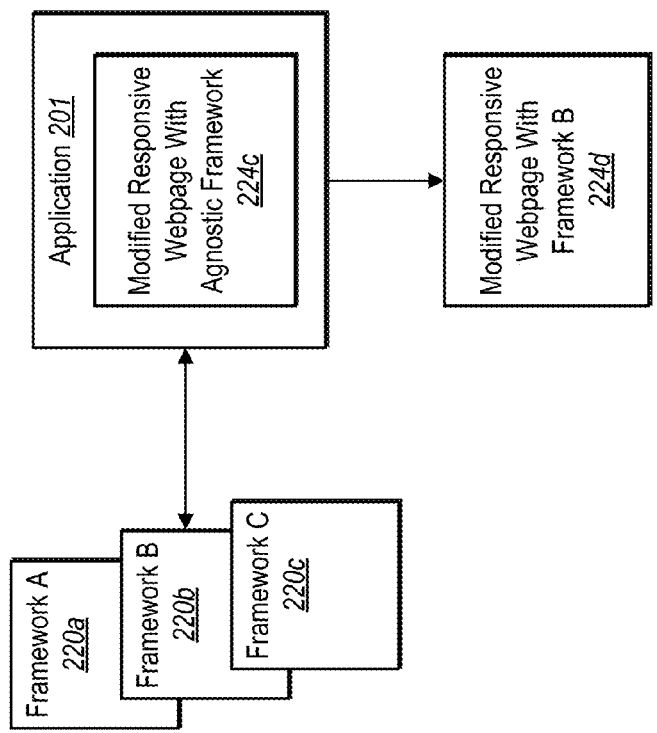
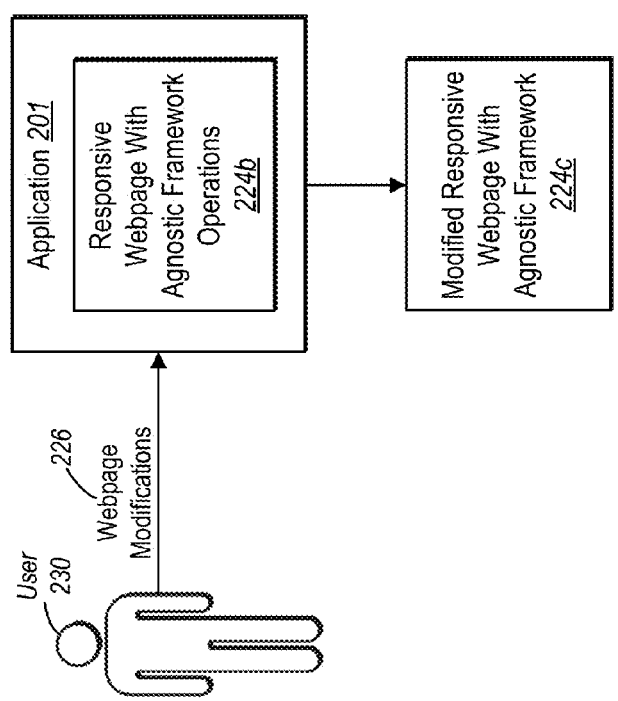
Fig. 2D
Fig. 2C

SUPPORTING WEBPAGE DESIGN AND REVISION IRRESPECTIVE OF WEBPAGE FRAMEWORK

BACKGROUND

1. Technical Field

One or more embodiments of the present disclosure relate generally to editing webpages. More specifically, one or more embodiments of the present disclosure relate to systems and methods for providing an agnostic framework schema for modifying a responsive webpage irrespective of the framework used to create the webpage.

2. Background and Relevant Art

Individuals often use a number of different computing devices to access the Internet during their daily activities. When a person accesses Internet content on a computing device, the computing device determines how to render the content so that the computing device may best present the content. As is often the case, the presentation of the online content may be based on the display capabilities of the computing device the person is using to access the content. For example, a person may access a website, such as a shopping website, using a laptop. The same person may also access the same website using a smartphone. Because the display capabilities of the laptop and smartphone may vary, the presentation of the website on the two devices may also vary.

To accommodate for the display capabilities of various computing devices, webpage designers (e.g., users) have started designing webpages that provide different presentations of a webpage depending on the display capabilities of a computing device. One common approach is called responsive web design, which is based on a responsive framework. In responsive web design, a webpage is designed to provide an optimal viewing experience (e.g., providing easy reading and navigation with a minimum of resizing, panning, and scrolling) across a wide range of devices (e.g., from desktop computers to various mobile phones).

Creating a responsive webpage from a responsive framework, however, can lead to a number of drawbacks. For example, once a user selects a responsive framework to use to create a responsive webpage, the user (e.g., a developer) is typically limited to following the expressions and operations allowed by the chosen responsive framework. As a further drawback, when the user wants to modify a responsive webpage after creating the responsive webpage, the user may need to manually code the changes by hand, but if the user does not adhere to the constraints of the responsive framework, the modified responsive webpage may not properly display.

As an alternative to manually hard-coding modifications to a responsive webpage, the user may, when available, use a web design program to create and modify a responsive webpage. In many cases, however, using a web design program does not improve the user's experience. For example, web design programs are often limited to creating and modifying responsive webpages using a single responsive framework. As such, if a user employs a web design program that supports a particular responsive framework, the user is limited to using the particular framework associated with the web design program.

As another drawback, if the user created a responsive webpage under another responsive framework than the particular responsive framework supported by the web design program, the user often cannot use the web design program to modify the responsive webpage. Instead, the user can choose to either start over and redesign the responsive webpage using the particular framework provided by the web design program or use another web design program that supports the responsive framework corresponding to the responsive webpage the user created. This problem compounds when a user works with multiple responsive web pages that correspond to various responsive frameworks, which may cause the user to switch between a number of web design programs, or manually redesign and recreate each responsive webpage to fit the particular responsive framework supported by the web design program.

As another problem, responsive frameworks are often upgraded. As a result, older versions of the responsive framework often become incompatible with the new version. Further, new responsive frameworks are also being developed and used. Each time a responsive framework is upgraded or created, a user may need to switch to yet another web design program that accommodates the upgraded or new responsive frameworks, which would require the user to become acquainted with the look and feel of the new web design program. Thus, with upgrades and new responsive frameworks, a user may spend large amounts of time preparing to modify responsive webpage before the user actually is able to modify a responsive webpage.

These and other problems exist with regard to managing and modifying webpages that are based on different responsive frameworks.

BRIEF SUMMARY

Embodiments of the present disclosure provide benefits and/or solve one or more of the foregoing or other problems in the art with systems and methods for providing tooling support for multiple responsive frameworks. In one or more embodiments, the systems and methods described herein use an agnostic platform for editing webpages of different CSS responsive frameworks. In particular, the systems and methods may enable a user to modify responsive webpages irrespective of the responsive framework used to create the responsive webpage. Further, when a user makes modifications to a responsive webpage, the systems and methods can apply the modifications using the appropriate responsive framework corresponding to the responsive webpage.

To illustrate, the systems and methods can identify a plurality of response frameworks. For each responsive framework, the systems and methods can identify expressions that describe each framework and operations that are supported by each framework. After identifying expressions and operations of each responsive framework, the systems and methods can translate the expressions and operations into a framework agnostic schema.

Upon loading a responsive webpage, the systems and methods may apply the agnostic framework schema to the responsive webpage, which can enable a user to modify the responsive webpage. When the user makes modifications to the responsive webpage, the systems and methods may apply the changes to the responsive webpage using the particular responsive framework that corresponds to the responsive webpage. In this manner, a user may advantageously use the systems and methods to modify a number of responsive webpages corresponding to different responsive frameworks without the user needing to track which responsive framework corresponds to which responsive webpage. Furthermore, regardless of the responsive webpage to which a responsive webpage corresponds, the systems and methods may provide the user with a unified experience that allows the user to modify responsive webpages using a familiar agnostic framework rather than requiring the user to learn different responsive framework operations for each type of responsive framework the user encounters.

The systems and methods may provide a number of benefits over conventional web design systems. For example, as briefly described above, the systems and methods allow a user to easily modify responsive webpages corresponding to different responsive frameworks. Further, the systems and methods provide an agnostic framework that offers a familiar look and feel to the user when the user is modifying responsive webpages. As another advantage, the systems and methods disclosed herein can easily adapt to accommodate and incorporate upgraded responsive frameworks or new responsive frameworks.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore considered to be limiting of its scope, the invention will be described and explained with additional specificity and detail through the use of the accompanying drawings in which:

FIGS. 2A-2D illustrates an example application interacting with responsive frameworks and a responsive webpage in accordance with one or more embodiments;

DETAILED DESCRIPTION

Figure 1:
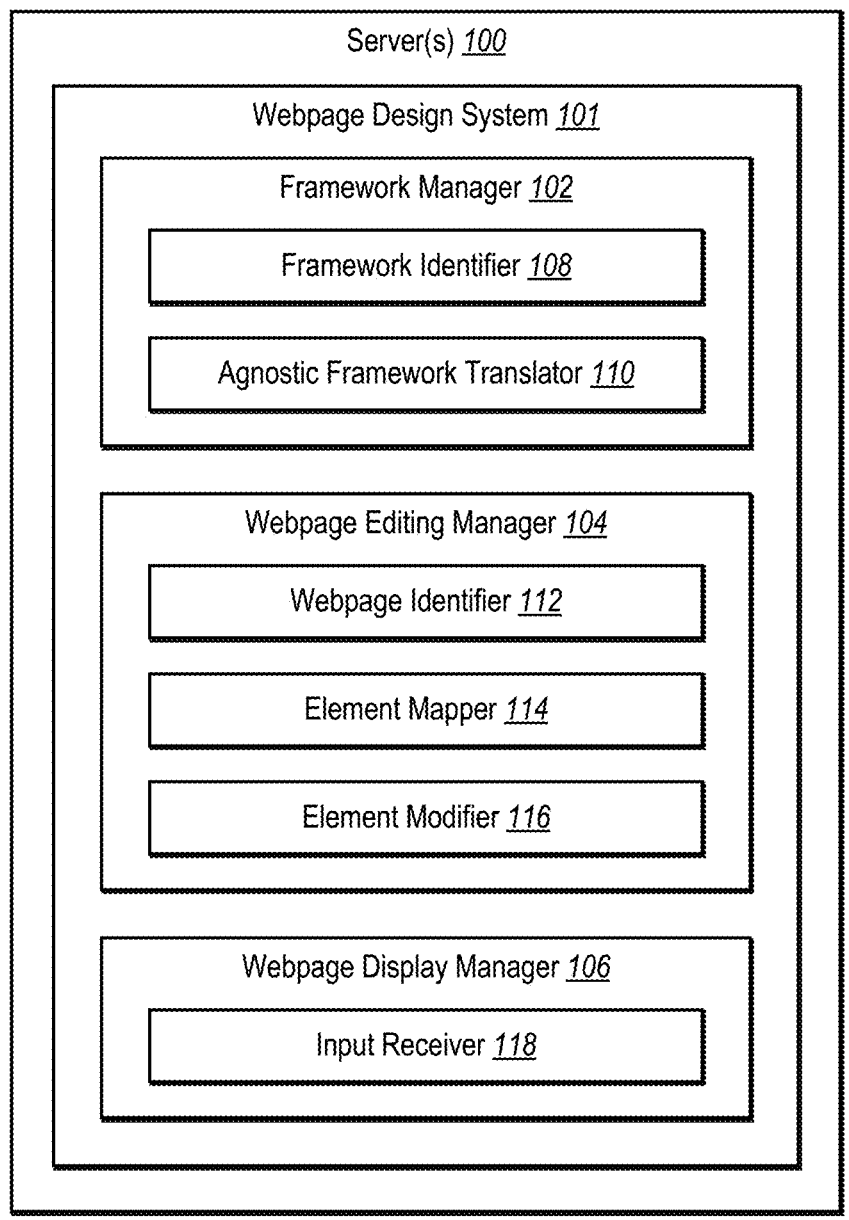
FIG. 1 illustrates an example schematic diagram of a webpage design system in accordance with one or more embodiments.

One or more embodiments of the present disclosure include a webpage design system that enables a user to agnostically edit responsive webpages irrespective of the responsive framework used to create the responsive webpage. In particular, in one or more embodiments, the webpage design system converts responsive frameworks into an agnostic responsive framework. Once the webpage design system generates the agnostic responsive framework, the webpage design system can enable a user to modify a responsive webpage using expressions and operations of the agnostic framework irrespective of the specific responsive framework used to create the responsive webpage. The webpage design system can further apply modifications provided by a user to the responsive webpage using the responsive framework to which the responsive webpage corresponds.

To illustrate, a user may need to modify a number of responsive webpages. Some of the responsive webpages may correspond to one responsive framework while other responsive webpages may correspond to another responsive framework. Using the webpage design system, the user may load each of the responsive webpages and modify each of the responsive webpages using common operations, even though the responsive webpages correspond to different responsive frameworks. In particular, the webpage design system may translate the various responsive frameworks that correspond to the responsive webpages into an agnostic responsive framework. Then the webpage design system can provide the agnostic framework to the user for each responsive webpage that the user edits.

In some embodiments, when the webpage design system provides the agnostic framework to a user to edit a responsive webpage, the webpage design system can map operations of the agnostic framework to elements in the responsive webpage. For example, if the webpage design system identifies column elements in the responsive webpage, the webpage design system maps agnostic framework operations that correspond to columns (e.g., change column size, offset, position, add another column, or delete column) to the identified column elements. As another example, if the webpage design system identifies text box elements, the webpage design system maps agnostic framework operations corresponding to text boxes (e.g., edit font size, font color, bold, italics, or underlined) to the identified text box elements. In this manner, the webpage design system can provide a unified editing experience to a user as the user modifies responsive webpages that correspond to different responsive frameworks.

Further, in one or more embodiments, the webpage design system translates selected agnostic framework operations back into responsive framework operations. For instance, when a user selects an agnostic framework operation (e.g., selects an option or command associated with the operation), the webpage design system translates the agnostic framework operation back to the corresponding responsive framework operation and then executes the responsive framework operation. Thus, when a user modifies a responsive webpage through agnostic framework operations, the result of the modification is a modified responsive webpage coded according to the responsive framework to which the responsive webpage corresponds.

The webpage design system provides a number of benefits and advantages, as mention above. As one example, the webpage design system enables a user to easily modify responsive webpages that correspond to different responsive frameworks. Thus, the webpage design system may provide the same familiar agnostic framework to the user regardless of whether the user is modifying a single responsive webpage corresponding to one responsive framework or modifying multiple responsive webpages corresponding to multiple responsive frameworks.

As another example, the webpage design system can easily adapt to accommodate and incorporate upgraded responsive frameworks or new responsive frameworks. For example, if a new responsive framework or other type of webpage framework becomes popular, the webpage design system can incorporate the new webpage framework into the agnostic framework. Similarly, when a responsive framework is updated, such that the updated version is not fully compatible with a previous framework version, the webpage design system can automatically detect that a responsive webpage corresponds to the updated responsive framework, incorporate the updated framework into the agnostic framework, and allow the user to modify the responsive webpage using the webpage design system as if the responsive webpage was based on a previous responsive framework version or any other responsive framework.

As used herein, the term "cascading style sheet" or CSS refers generally to a style sheet language used for describing the look and formatting of a document written in a markup language, such as a HTML (hypertext markup language) or a XML (extensible markup language) document. CSS uses elements such as the layout, colors, and fonts to organize the presentation of content. In general, CSS helps to improve content accessibility and to provide flexibility and control in presenting content.

The term "CSS framework," as used herein, generally refers to style libraries that use CSS language. A CSS framework can include expressions that describe the framework and operations that the framework supports. CSS frameworks can also include expressions that help identify elements, such as HTML elements, to which framework operations correspond, as well as other expressions that assist in performing the framework operations. A CSS framework generally provides a standards-compliant method of styling web pages. Current examples of CSS frameworks include Foundation, Blueprint, Bootstrap, Cascade Framework, and Materialize. In some cases, CSS frameworks provide a number of ready-made options for designing and laying out a web page to which users can build responsive webpages.

As used herein, the term "responsive webpage" refers generally to a webpage that includes fluid content design. For example, the layout in a responsive webpage can adapt to the viewing environment by using fluid, proportion-based grids, flexible images, and CSS media queries. In particular, responsive webpages often use a fluid grid concept that calls for page element sizing to be in relative units like percentages rather than absolute units like pixels or points. In addition, responsive webpages can use flexible images that are sized in relative units, which prevent images from being displaying outside their containing element. Further, CSS media queries enable a responsive webpage to use different CSS style rules based on characteristics of the computing device on which the responsive webpage is being displayed.

The term "responsive framework" refers generally to a responsive CSS framework that is used in connection with a responsive webpage. For example, upon a responsive webpage performing a CSS media query to determine which CSS style rules to use based on the display capabilities of the computing device on which the responsive webpage is displayed, the responsive webpage may access the responsive framework to obtain CSS style rules that match the determination. While the term responsive framework generally refers to a responsive CSS framework, in some embodiments, the term responsive framework refers to other types of responsive frameworks that correspond to responsive webpages.

As used herein, the term "agnostic framework" generally refers to a universal, all-purpose, and/or generic responsive CSS framework that is not tied to a standardized responsive CSS framework (e.g., Foundation, Blueprint, Bootstrap, Cascade Framework, and Materialize). Further, an agnostic framework can incorporate the expressions and operations of standardized CSS frameworks into general expressions and operations. In some example embodiments, the agnostic framework serves as an intermediary layer and allows the webpage design system to provide the same look and feel when to a user modifying a responsive webpage irrespective of the responsive framework to which the responsive webpage corresponds.

In some example embodiments, the agnostic framework provides uniform labels for expressions and operations incorporated from a standardized responsive CSS framework. As such, when the webpage design system translates or converts a standardized responsive CSS framework into an agnostic framework, the expressions and operations from the standardized responsive CSS framework can be relabeled into commonly labeled expressions and operations for presentation to a user. Alternatively, the expressions and operations from the standardized responsive CSS framework can be associated with agnostic framework commands that are presented to a user when the user is editing a responsive webpage.

As used herein, the term "element" refers generally to an HTML element, which is an individual component of an HTML document or webpage. An element can have specified attributes and/or content, including other elements and text. An element may also provide semantics. For example, a title element can represent the title of the document.

The term "application," as used herein, generally refers to a hardware or software application. In some cases, an application can be a set of computer programs designed to permit a user to perform a group of coordinated functions, tasks, or activities. Examples of applications can include, but are not limited to, a word processor, a spreadsheet design and management system, a console game, a design system, or a document management system.

The term "digital environment," as used herein, generally refers to an environment that is implemented, for example, as a stand-alone application (e.g., a personal computer or mobile application running on a computing device), as a module of an application, as a plug-in for applications including social media applications, as a library function or functions that may be called by other applications such as web design applications, and/or as a cloud-computing system. A digital medium environment allows users to create, edit, and/or modify electronic documents, such as webpages.

FIG. 1 illustrates a schematic diagram illustrating an example embodiment a webpage design system 101. As shown, in one or more embodiments, one or more servers implement or host the webpage design system 101. For example, a cluster of servers, a pair of servers, or a single server can host the webpage design system 101. In alternative embodiments, a client device implements or hosts the webpage design system 101. In particular, a laptop computer, a tablet computer, a mobile phone, or another computing device (such as those describe below with reference to FIG. 8) implements the webpage design system 101. The webpage design system 101 includes various components for performing the processes and features described herein. For example, as shown in FIG. 1, the webpage design system 101 includes a framework manager 102, a webpage editing manager 104, and a webpage display manager 106. The framework manager 100 further includes a framework identifier 108 and an agnostic framework generator 110. The webpage editing manager 104 includes a webpage identifier 112, an element mapper 114, and an element modifier 116. The webpage display manager 106 includes an input receiver 118.

Although the disclosure herein describes the components 102-118 of the webpage design system 101 as separate components, as illustrated in FIG. 1, any of the components 102-118 may be combined into fewer components, such as into a single facility or module, or divided into more components as may serve one or more embodiments. Further, it will be recognized that any of components 102-118 may be combined into fewer components, such as into a single component, or divided into more components as may serve a particular embodiment.

The components 102-118 of the webpage design system 101 can comprise software, hardware, or both. For example, the components 102-118 can comprise one or more instructions stored on a computer-readable storage medium and executable by processors of one or more computing devices, such as a client device or server device. When executed by the one or more processors, the computer-executable instructions of the webpage design system 101 can cause the computing device(s) to perform the webpage editing as described herein. Alternatively, the components 102-118 of the webpage design system 101 can comprise hardware, such as a special purpose processing device to perform a certain function or group of functions. Additionally, or alternatively, the components 102-118 can comprise a combination of computer-executable instructions and hardware.

As mentioned above and as shown in FIG. 1, the webpage design system 101 includes a framework manager 102. In general, the framework manager 102 may identify various responsive frameworks and generate an agnostic framework from one or more identified responsive frameworks. More specifically, the framework manager 102 may include a framework identifier 108 and an agnostic framework generator 110.

As an overview, a responsive framework can include features, such as expressions that describe the framework and operations supported by the framework. In addition, a responsive framework can include additional expressions that help identify elements, such as HTML elements, in a corresponding responsive webpage. Further, a responsive framework can include other expressions that help in performance of the operations in the responsive framework. Examples of operations can include, but are not limited to, resizing, offsetting, and hiding elements on a corresponding webpage.

As mentioned above, numerous types and versions of responsive frameworks exist. While responsive frameworks are generally different in terms of expressions and operations, many responsive frameworks include a number of similar operations to each other because responsive frameworks are directed towards the overall goal providing a stylistic and functional framework for presenting responsive webpages. For example, most response frameworks contain a grid structure and operations to manage and manipulate the grid. As another example, many responsive frameworks include operations to hide content.

While many responsive frameworks include similar operations, it should be noted that the syntax and execution of similar operations across various responsive frameworks are not unified. Accordingly, one operation under one responsive framework may be written and/or executed differently from the same or similar operations in another responsive framework. Further, while responsive frameworks can include a number of common operations, it should also be noted that a responsive framework can also include features not included in another responsive framework, such as features directed toward the layout, typography, forms, etc., of a responsive webpage.

Returning to FIG. 1, the framework manager 102 includes a framework identifier 108. The framework identifier 108 may identify various responsive frameworks. In one or more embodiments, the framework identifier 108 identifies a responsive framework based on user input or by parsing the responsive framework. For example, the framework identifier 108 can parse a responsive framework to locate identification information (e.g., a framework name) that the framework identifier 108 can use to identify the responsive framework. As another example, the framework identifier 108 detects the identity of the responsive framework by discovering distinguishing syntax within the responsive framework.

As part of, or in addition to, identifying a responsive framework, the framework identifier 108 may import, open, and/or load the responsive framework. For example, the framework identifier 108 loads the content from the responsive framework into the webpage design system 101 such that the framework identifier 108 can access the content within the responsive framework. In some example embodiments, the framework identifier 108 identifies and loads a number of responsive frameworks into webpage design system 101.

Upon loading the responsive framework, the framework identifier 108 can access content in features within the responsive framework by parsing the responsive framework. For instance, the framework identifier 108 parses the content within a loaded responsive framework using regular expressions, which allows the framework identifier 108 to identify known elements and/or structural components found within the responsive framework. As such, by parsing the responsive webpage, the framework identifier 108 can identify features, such as expressions, classes, and operations, corresponding to the responsive framework.

Once the framework identifier 108 identifies one or more features in the responsive framework, the framework manager 108 can create an agnostic framework based on the identified responsive framework. In particular, the agnostic framework generator 110 can create an agnostic framework that incorporates the features of the identified responsive framework. As described below, the agnostic framework can include similar features as the responsive framework identified by the framework identifier 108.

In one or more embodiments, the framework manager 108 creates an agnostic framework using a schema. The schema allows the framework manager 108 to create the agnostic framework for any responsive framework in a uniform manner. In one or more embodiments, the agnostic framework can comprise an XML framework file that includes expressions that help describe the responsive framework, operations that are supported by the responsive framework, expressions that help identify HTML elements on which operations is permitted using the responsive framework, and other expressions that help perform operations. The framework identifier 108 can generate the XML framework file using a schema such that each XML framework file for each responsive framework is consistently constructed/organized despite the differences in the responsive frameworks upon which the XML framework files are based.

For example, the following is an example portion of an XML framework file for the Bootstrap framework:

```
<?xml version="1.0" encoding="utf-8"?>
<framework>
    <frameworkName>Bootstrap</frameworkName>
    <frameworkVersionSupportFrom>3.2
    </frameworkVersionSupportFrom>
    <frameworkVersionRegex>v([.\d]+[.\d])</frameworkVersionRegex>
    <numBreakpoints>3</numBreakpoints>
    <mediaQueryRegex>\(min-width:\s*\d+\.?\d*</mediaQueryRegex>
    <gridContainerClass>container</gridContainerClass>
    <gridFluidContainerClass>container-fluid</gridFluidContainerClass>
    <rowClass>row</rowClass>
    <mqunit>px</mqunit>
    <resize>
        <dependsOnMaxCols>false</dependsOnMaxCols>
        <resizeClassRegex>col-xs-[\d]+</resizeClassRegex>
        <resizeClassRegex>col-sm-[\d]+</resizeClassRegex>
        <resizeClassRegex>col-md-[\d]+</resizeClassRegex>
        <resizeClassRegex>col-lg-[\d]+</resizeClassRegex>
    </resize>
    <offset>
        <dependsOnMaxCols>false</dependsOnMaxCols>
        <offsetClassRegex>col-xs-offset-[\d]+</offsetClassRegex>
        <offsetClassRegex>col-sm-offset-[\d]+</offsetClassRegex>
        <offsetClassRegex>col-md-offset-[\d]+</offsetClassRegex>
        <offsetClassRegex>col-lg-offset-[\d]+</offsetClassRegex>
    </offset>
    <hide>
        <hideClassRegex>hidden-xs</hideClassRegex>
        <hideClassRegex>hidden-sm</hideClassRegex>
        <hideClassRegex>hidden-md</hideClassRegex>
        <hideClassRegex>hidden-lg</hideClassRegex>
    </hide>
    <unhide noRegex="true">
    </unhide>
    <!-- Does not have support for centering elements -->
</framework>
```

As shown the example XML framework file includes identification information such as the name of the framework, the versions of the framework supported, operations that are supported by the responsive framework, expressions that help identify HTML elements on which operations is permitted using the responsive framework, and other expressions that help perform operations.

As shown, the agnostic framework generator 110 can use the expressions and operations from the identified responsive framework to create the agnostic framework (e.g., an agnostic framework schema). For example, the agnostic framework generator 110 translates the operations in the identified responsive framework into common or agnostic operations in the agnostic framework. For instance, the agnostic framework generator 110 translates the operation of adding a new element from the identified responsive framework to an equivalent agnostic operation in the agnostic framework. As another example, rather than translating operations from the responsive framework to the agnostic framework, the agnostic framework generator 110 may copy over and rename one or more operations from the responsive framework, as part of populating the agnostic framework.

Thus, the agnostic framework can allow a web page editing application to enable a user to edit a web page. In particular, the agnostic framework can provide an intermediary abstraction of the CSS framework used to design the web page. Thus, the agnostic framework can map the abstracted functionality to classes in the CSS framework for performing edits using the CSS framework. For example, the agnostic framework can map each set of operations to a basic set of classes that a given framework provides.

In some example embodiments, the agnostic framework generator 110 translates a single responsive framework into a corresponding agnostic framework. In alternative embodiments, the agnostic framework generator 110 converts multiple responsive frameworks into an agnostic framework. Regardless of the number of responsive frameworks that the agnostic framework generator 110 converts into an agnostic framework, the agnostic framework generator 110 may use common labels in the agnostic framework for equivalent operations among the various responsive frameworks. For example, the framework generator 110 can use standardized operation labels for operations listed in the agnostic framework.

In creating an agnostic framework, the agnostic framework generator 110 can include an identifier in the agnostic framework that indicates the responsive framework to which the agnostic framework corresponds. For example, if the agnostic framework generator 110 translates a first responsive framework into an agnostic framework schema, the agnostic framework generator 110 creates a responsive framework element (e.g., an HTML tag) in the agnostic framework schema that references the first responsive framework. Similarly, if the agnostic framework is based on a second responsive framework, the agnostic framework generator 110 can point to the second responsive framework in the agnostic framework.

In the case that the agnostic framework generator 110 is based on a number of responsive frameworks, the agnostic framework generator 110 can include a reference to each of the responsive frameworks to which the agnostic framework corresponds. When multiple responsive frameworks are incorporated into a single agnostic framework, the agnostic framework generator 110 may add additional syntax for expressions and operations within the agnostic framework to identify to which responsive framework the operation corresponds.

To illustrate, the agnostic framework may include a center text operation translated from a first responsive framework and a center text operation translated from a second responsive framework. Because the center text operations for the two responsive frameworks are translated as the same operation in the agnostic framework, the agnostic framework generator 110 may add a tag to each operation to identify the responsive framework to which the operation corresponds. In this manner, when the webpage design system 101 loads a responsive webpage to allow a user to modify the responsive webpage, as described below, the webpage design system 101 can identify the appropriate center text operation to execute when a user desires to center an element in the responsive webpage.

As an alternative and or additional illustration, when multiple responsive frameworks are incorporated into a single agnostic framework, the agnostic framework generator 110 may partition operations corresponding to each responsive framework into sections, where each section relates to a particular the responsive framework. For example, a first section corresponds to a first responsive framework and includes a center text operation translated from the first responsive framework and a second section corresponds to a second framework and includes a center text operation from the second responsive framework. Then, when the webpage design system 101 provides the agnostic framework in connection with modifying a responsive webpage, the webpage design system 101 can identify the appropriate section of the agnostic framework that corresponds to the identified elements in the responsive webpage, as described below, and provide the appropriate operations to the user.

In view of the one or more of the embodiments described above, the framework manager 102 can identify various responsive frameworks and translate features of the responsive frameworks into one or more agnostic frameworks. Further, by converting the features from multiple responsive frameworks into one or more agnostic frameworks, the framework manager 102 can unify similar operations across the various responsive frameworks to provide a user with a unified, consistent, and familiar user-experience when a user modifies a responsive webpage, as described below.

As shown in FIG. 1 and as mentioned above, the webpage design system 101 includes the webpage editing manager 104 and the webpage display manager 106. The webpage editing manager 104 can manage the editing of responsive webpages. For example, if a user is using the webpage design system 101 to modify a responsive webpage, the webpage editing manager 104 provides the user with the necessary tools and functions to edit the responsive webpage. The webpage display manager 106 can display one or more webpages as a user is modifying or editing a responsive webpage.

In some example embodiments, the webpage editing manager 104 functions in conjunction with the webpage display manager 106. For example, as a user modifies a responsive webpage, the webpage editing manager 104 provides the user with modification tools while the webpage display manager 106 displays updated versions of the modified responsive webpage. Further, in one or more embodiments, the webpage editing manager 104 receives user input from the webpage display manager 106. In particular, when the input receiver 118 in the display manager 106 detects user input, such as selection of a command or tool, the webpage display manager 106 may provide the user input to the webpage editing manager 104.

In the embodiment shown in FIG. 1, the webpage editing manager 104 includes a webpage identifier 112, an element mapper 114, and an element modifier 116. The webpage identifier 112 can open one or more responsive webpages within the webpage design system 101. More specifically, the webpage identifier 112 may open a responsive webpage stored on a local computing device or hosted remotely on a remote storage device or server. To illustrate, when a user provides or selects a responsive webpage (e.g., directly or through a link) to the webpage identifier 112, the webpage identifier 112 opens the responsive webpage and accesses the content within the responsive webpage.

In addition to opening responsive webpages, the webpage identifier 112 can identify content within the responsive webpages. For example, when the webpage identifier 112 opens a responsive webpage, the webpage identifier 112 parses the content of the responsive webpage to identify elements, such as HTML elements. More specifically, the webpage identifier 112 can parse the responsive webpage into the document object model (DOM), which allows the webpage identifier 112 to identify elements in the responsive webpage. Further, parsing the responsive webpage into the DOM allows the webpage display manager 106 to display the responsive webpage to a user.

In some example embodiments, the webpage identifier 112 detects particular elements in the responsive webpage. For example, the webpage identifier 112 detects one or more breakpoints elements in the responsive webpage. As an overview, a breakpoint in a responsive webpage is an indicator that allows the responsive webpage to resize to suit various display widths and resolutions. In other words, depending on the display capabilities of a computing device, for example obtained through a query, a web browser may determine which breakpoint to use when displaying the responsive webpage to the user to optimize the viewing experience for the user.

After identifying the breakpoints in the responsive webpage, the webpage identifier 112 may provide the breakpoint information to the webpage display manager 106, which can use the breakpoint information to prepare a grid model and a user interface model. As an example, the webpage display manager 106 uses the breakpoint information to identify the number of columns in the grid framework for each breakpoint segment. Using the breakpoint information, the webpage display manager 106 can properly display one or more versions of the responsive webpage to a user.

In addition to identifying elements in a responsive webpage, in some example embodiments, the webpage identifier 112 identifies a responsive framework that supports the responsive webpage. As mentioned above, a responsive webpage generally is tied to a responsive framework, which provides the responsive webpage with stylistic guidelines and rules for displaying the layout and content of the responsive webpage. As such, using identified elements in the responsive webpage; the webpage identifier 112 may identify a responsive framework to which the responsive webpage corresponds. Once the webpage identifier 112 identifies the proper responsive framework, the webpage identifier 112 can then identify the agnostic framework that corresponds to the identified responsive framework. Alternatively, the webpage identifier 112 may directly identify the agnostic framework corresponding to the proper responsive framework based on the identified elements of the responsive webpage.

Regardless of how the webpage identifier 112 identifies the agnostic framework, once the webpage identifier 112 identifies an agnostic framework and elements of the responsive webpage, the element mapper 114 may map features of the corresponding agnostic framework to the identified elements of the responsive webpage. More specifically, the element mapper 114 may correlate operations from the identified agnostic framework to elements of the responsive webpage.

To illustrate, the element mapper 114 may analyze the elements in the responsive webpage and compare the analyzed elements to the operations in the agnostic framework. Based on the comparison, the element mapper 114 may identify one or more operations in the agnostic framework that correspond to elements in the responsive webpage. The element mapper 114 may map the one or more corresponding operations of the agnostic framework to an element of the responsive webpage. For example, upon identifying a grid column in the responsive webpage, the element mapper 114 maps operations that are related to column modifications from the agnostic framework, such as operations to resize, hide, or remove the column, change column properties, add a new column, etc. As such, the element mapper 114 can create a mapping of supported operations for each element in the responsive webpage.

In one or more embodiments, the element mapper 114 includes the mappings in a user interface model provided to the webpage design manager 106. In this manner, when the element mapper 114 has mapped some or all of the elements in the responsive webpage to corresponding operations, the element mapper 114 can wait for a user to select an element in the responsive webpage before displaying corresponding operations for the selected element. To illustrate, upon a user selecting an element in the responsive webpage, the webpage display manager 106 may access the user interface model, identify the appropriate available operations (e.g., menu options and/or available editing tools) mapped to the selected element, and provide the available operations corresponding to the selected element to the user.

When a user provides user input by selecting an operation or command (e.g., a command to resize, offset, add new rows, columns, hide/unhide elements) to modify an element in the responsive webpage, the webpage editing manager 104 may implement the change in the responsive webpage. In particular, the element modifier 116 of the webpage editing manager 104 may implement user modifications to the responsive webpage in response to a user selecting an operation or command in connection with an element. An illustrative example of presented available editing commands to a user upon the user selecting an element is provided below in connection with FIGS. 3A-4B.

The element modifier 116, in one or more embodiments, implements user modifications to the responsive webpage using operations from the responsive framework to which the responsive framework corresponds. To illustrate, when the user selects a command corresponding to an element within the responsive webpage (e.g., the user selects the "add a row" command), the element modifier 116 identifies the operation in the agnostic framework corresponding to the command selected by the user. Then using the identified operation, the element modifier 116 remaps, or retranslates the agnostic framework operation back into a responsive framework operation. Alternatively, the element modifier 116 uses the identified agnostic framework operation to identify the matching operation in the corresponding responsive framework. Using the retranslated and/or matched responsive framework operation, the element modifier 116 executes the operation within the responsive webpage. Then after the responsive framework executes the responsive framework operation, the responsive webpage updates to reflect the command that the user selected.

FIGS. 2A-2D illustrates an example application 201 interacting with frameworks 220a-c and a responsive webpage 224. The application 201 in FIGS. 2A-2D may be an example embodiment of the webpage design system 101 described above. As an overview of FIGS. 2A-2D, the application 201 translates multiple responsive frameworks into one or more agnostic frameworks. Then, the application applies webpage modifications from a user to a responsive webpage to create modified responsive webpage. As illustrated in FIGS. 2A-2D, the application may serve as an intermediary layer that provides a unified user experience to a user as the user modifies responsive webpages.

Figure 2B:
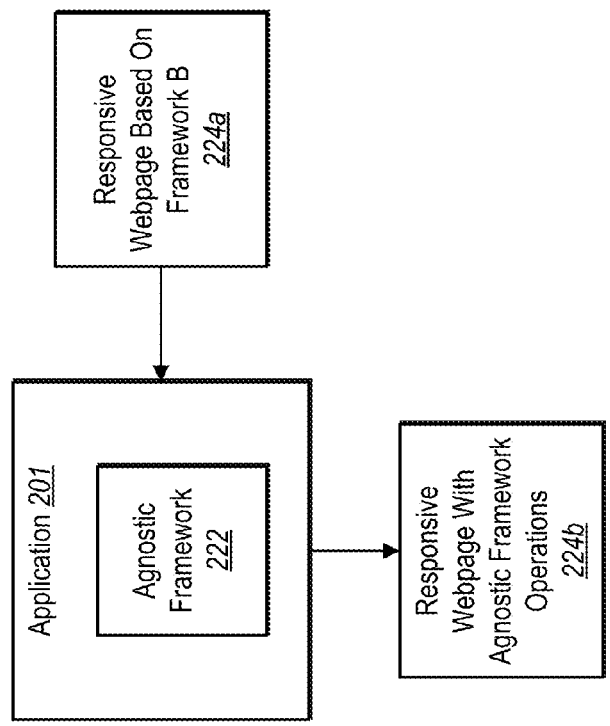
Figure 2A:
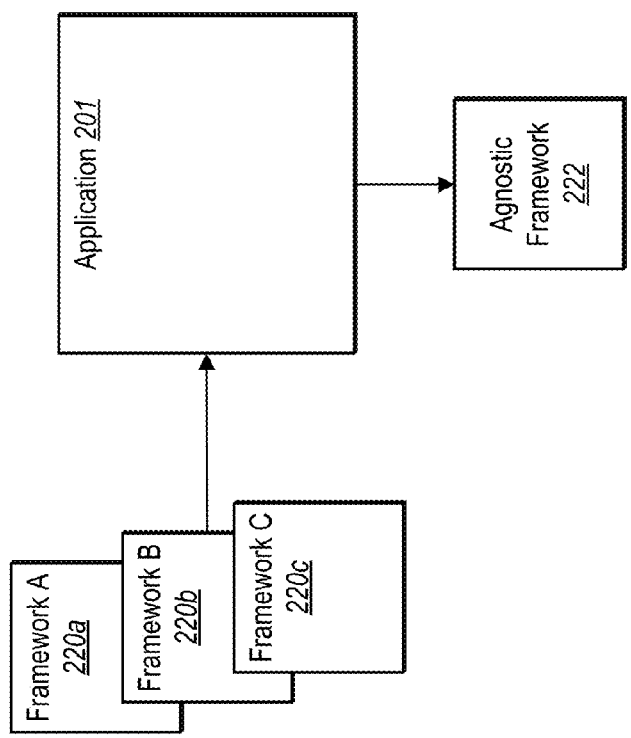

As shown in FIG. 2A, the application 201 receives one or more responsive frameworks, such as Framework A 220a, Framework B 220b, and Framework C 220c. In one or more embodiments, the application 201 receives the responsive frameworks from a framework repository, has the responsive frameworks loaded into the application by way of an application update, accesses the responsive frameworks from local or remote storage, or has a user provide the responsive frameworks. While FIG. 2A illustrates three responsive frameworks being received at the application 201, one will appreciate that the application 201 may receive any number of responsive frameworks.

Upon receiving responsive frameworks, the application 201 may translate the received responsive framework(s) into an agnostic framework 222. As described above, the application 201 may create a separate agnostic framework for each responsive framework and/or the application may create a combined agnostic framework from multiple responsive frameworks. For example, the application 201 creates the agnostic framework 222 by converting the expressions and operations from Framework B 220b. Alternatively, the application 201 can convert expressions and operations from Framework A 220a and Framework C 200c into a second agnostic framework, which is not shown. For purposes of explanation, the agnostic framework 222 shown in FIGS. 2A and 2B includes translated expressions and operations from at least Framework B 220b. Expressions and operations from Framework A 220a and/or Framework C 220c, in some cases, may also be included in the agnostic framework 222 shown in FIGS. 2A and 2B.

In some example embodiments, when translating a responsive framework into an agnostic framework (for example an XML framework file), the application 201 translates similar operations from across responsive frameworks into commonly named operations. For example, if the application 201 is mapping hiding/un-hiding operations from Framework A 220a and conceal/reveal operations from Framework B 220b into the same or separate agnostic frameworks, the application 201 can translate the operations as hide/un-hide in the agnostic framework(s). In this manner, when the agnostic framework operations are provided to a user modifying a responsive webpage, as described below, the operations presented to the user are consistent and familiar. Alternatively, the application 201 may keep one or more naming conventions when translating a responsive framework into an agnostic framework. In this case, when the application 201 is providing the agnostic framework operations to the user, the application 201 can still maintain the look and feel of selecting and implementing operations so as to provide the user with a unified editing experience.

Once the application 201 creates an agnostic framework 222, the application 201 uses the agnostic framework 222 to modify responsive webpages. For example, a user can provide the application 201 access to a responsive webpage stored locally on a computing device or stored on a host server. As shown in FIG. 2B, a user provides a copy of a responsive webpage 224a to the application 201, which allows the application 201 to edit the responsive webpage 224a.

As indicated in FIG. 2B, the responsive webpage 224a corresponds to Framework B 220b. For example, the user and/or another entity may have previously created the responsive webpage using Framework B 220b. Thus, when the application 201 accesses the responsive webpage 224a, the application 201 can determine that the webpage corresponds to the Framework B 220b. In some embodiments, as described above, the application 201 parses the responsive webpage 224a to identify a link element that references Framework B 220b.

Upon detecting that the responsive webpage 224a corresponds to Framework B 220b, the application 201 identifies elements in the responsive webpage 224a and maps operations of the agnostic framework 222 (particularly those expressions and operations translated from Framework B 220b) to the identified elements of the responsive webpage 224a. For example, the application 201 maps row and column operations from the agnostic framework 222 to the responsive webpage 224a. Using the mapped agnostic framework operations, the application 201 creates a responsive webpage that includes associated agnostic framework operations 224b.

More particularly, using the information in the agnostic framework 222 and the Framework B 220b, the application 201 can access grid information described in the Framework B 220b and populated in a grid model to be used by the application 201. For example, the application 201 can parse the Framework B 220b, identify the number of breakpoints and their values, identify the number of columns in the grid framework for each breakpoint segment, and then store this information in the grid model. Additionally, the application can access and determine the number of columns and include them in the grid model. The grid model thus can allow the application to determine which classes from the Framework B 220b should be applied. In particular, the using the grid model, the application 201 can detect the view size the user is currently working on and application the appropriate classes from the Framework B 220b. As described below, the application 201 can using the current viewport and the information in the grid model to execute edit commands. In summary, the application 201 extracts information using regular expressions from the CSS Framework B 220b to construct the grid model that describes the CSS grid in the Framework B 220b.

Further, the application 201 may create a user interface model of the mappings that correlates one or more agnostic framework operations to elements in the responsive webpage. In particular, using information from the grid model and the HTML Source/DOM, the application identifies layout elements (like container, rows, and columns). The application 201 populates these elements into the user interface model.

The application then uses the user interface model to construct the user interface to allow a user to add, edit, and/or remove responsive layout elements and construct the responsive web page. To illustrate, as shown in FIG. 2C, the application 201 may display the responsive webpage with the agnostic framework operations 224b to a user 230, so that the user 230 can modify the responsive webpage 224b. Upon the user 230 selecting or giving focus to an element within the responsive webpage 224b, the application 201 can access the user interface mapping, identify which agnostic framework commands and/or tools corresponding to the selected element, and provide the identified agnostic framework commands and/or tools to the user 230. For example, when a user selects a text box, the application 201 may display options to the user that enable the user to hide the text box.

As shown in FIG. 2C as act 226, the user 230 provides webpage modifications to the application 201. For instance, the user 230 selects an element in the responsive webpage 224b and the application provides the user 230 with one or more commands, as described above. In response, the user 230 may select one of the operations provided by the application 201 that corresponds to a selected element. By selecting one of the provided operations, the user 230 is indicating to the application 201 to execute the selected operation. For example, when the user 230 selects the option to hide a text box, the user indicates to the application 201 to hide the corresponding text box.

When the application 201 receives user input indicating a webpage modification (act 226), the application 201 may begin to modify the responsive webpage with the agnostic framework operations 224b. To illustrate, FIG. 2C shows that the application 201 creating a modified responsive webpage with an agnostic framework 224c based on applying the website modifications from the user 230 to the responsive webpage with the associated agnostic framework operations 224b.

To execute the operation corresponding to the user input, the application 201 may need to execute the operation on the responsive webpage that corresponds to Framework B 220b using operations from Framework B. As such, the application 201 may need to translate or match the selected operation from the agnostic framework back to Framework B 220b. To illustrate, FIG. 2D shows the application 201 accessing Framework B 220b in order to remap the agnostic framework operation selected by the user 230 to the corresponding operation in Framework B 220b. For example, the application 201 can identify the current viewport and use information in the grid model to execute commands. In particular, the application 201 can use the grid model and other information from the agnostic framework 224c (e.g., the applicable framework classes) to generate, edit, or remove code from the HTML of the responsive web page. In other words, using the matching operation from Framework B 220b, the application 201 executes the operation and modifies the modified responsive webpage with an agnostic framework 224c into the modified responsive webpage corresponding to Framework B 224d.

The application 201 can implement the commands (e.g., edits) using any number of technologies (C++, JavaScript, etc.). In particular, the information that the application 201 uses from the grid model and the user interface model, in at least one embodiment, does not contain any information regarding the specific responsive framework due to the user of the agnostic framework. Thus, the application 201 can use the information in the grid model and the user interface model, create the relevant UI and implement any changes/commands/edits.

More specifically,

Once the application 201 constructs the modified responsive webpage corresponding to Framework B 224d, the application 201 creates the modified responsive webpage corresponding to Framework B 224d. In other words, the application 201 can provide the modified responsive webpage 224d to the user 230, such that the modified responsive webpage 224d reflects the modification indicated by the user 230. The process of presenting the responsive webpage to the user with the agnostic framework operations, receiving webpage modifications, and executing the operations using the corresponding responsive framework can be repeat until the user 230 is satisfied with the responsive webpage.

Figure 3A:
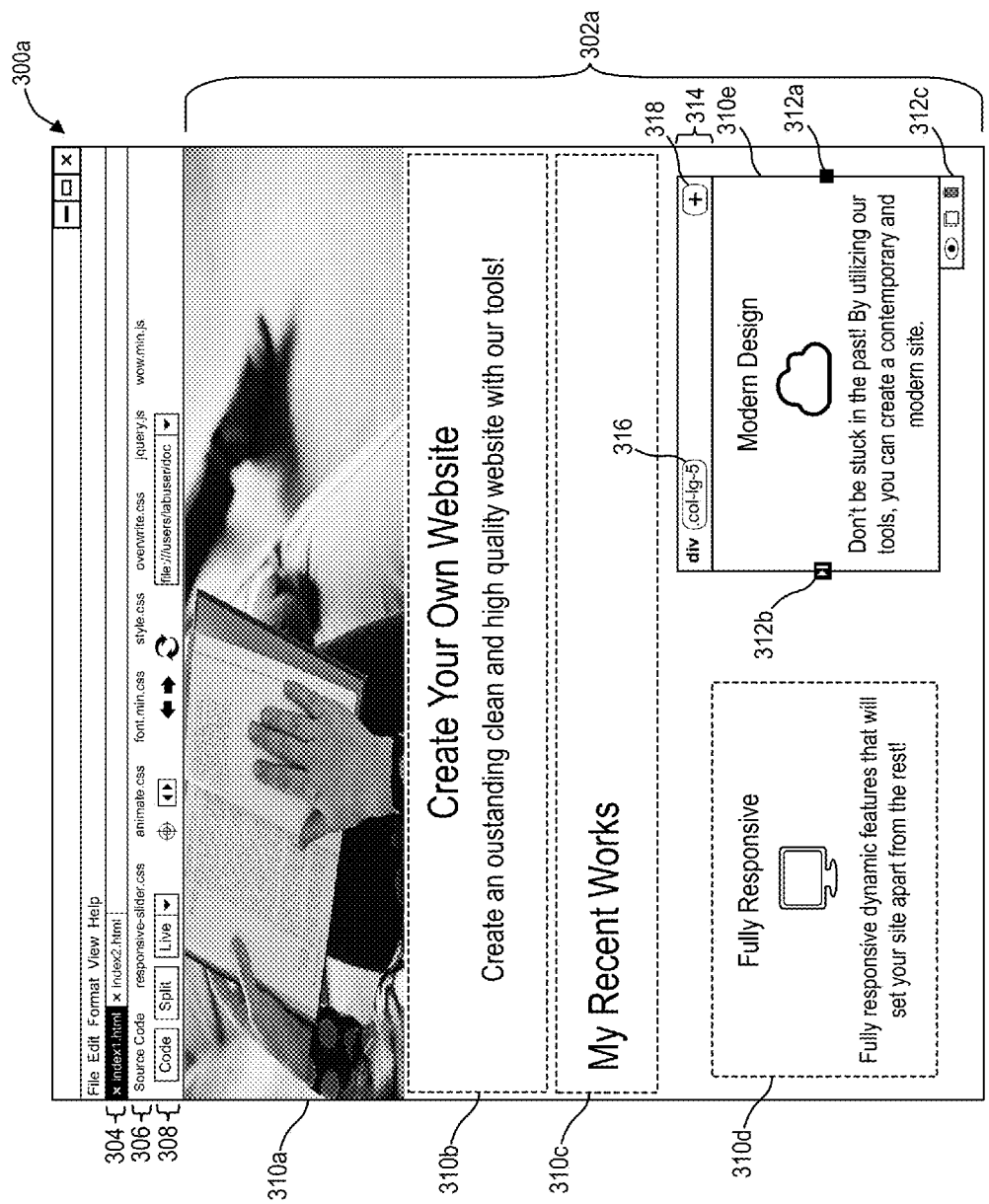
FIGS. 3A-3B illustrates example graphical user interfaces showing a first responsive webpage corresponding to a first responsive framework and the first responsive webpage corresponding to an agnostic framework in accordance with one or more embodiments.
Figure 3B:
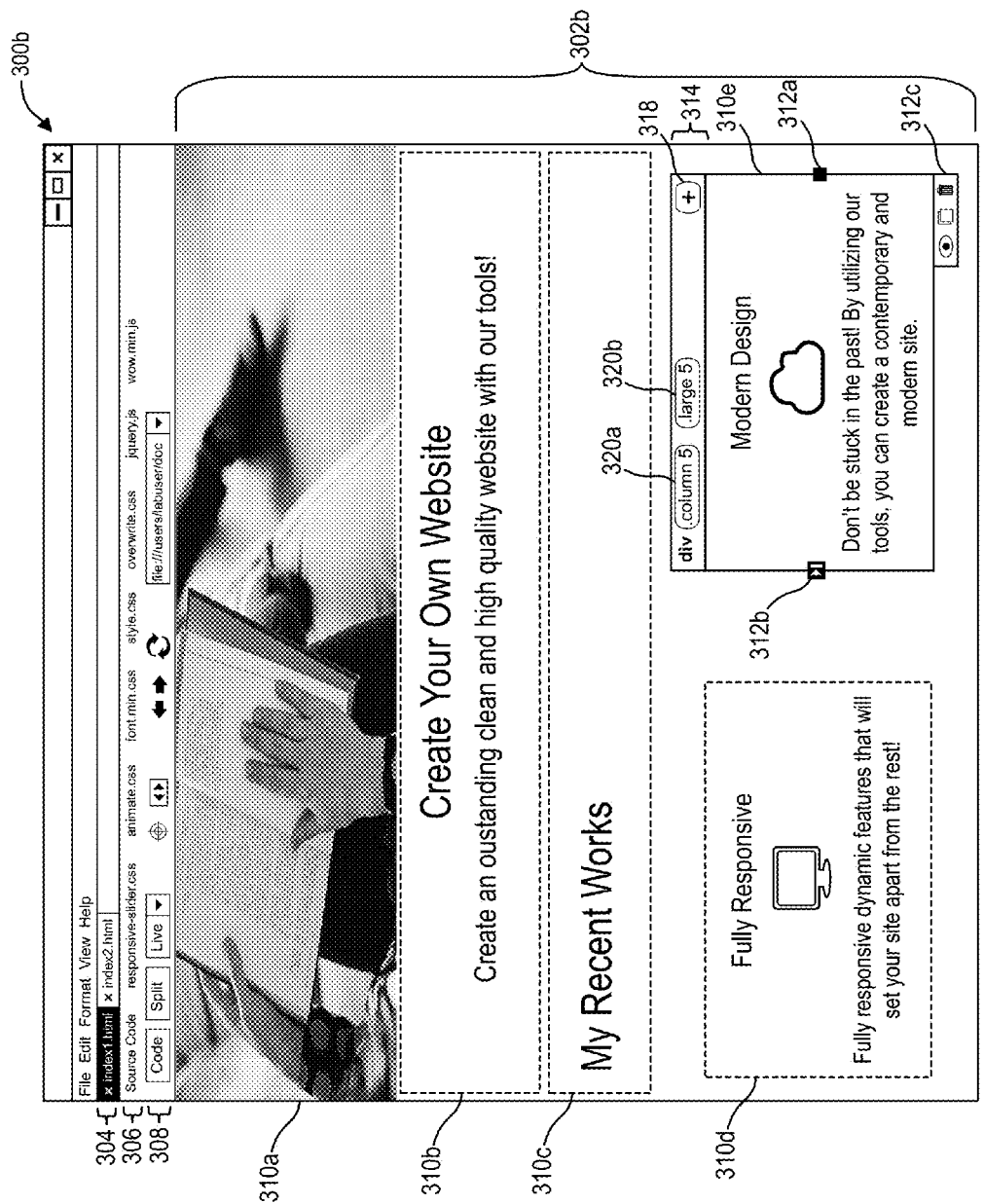

FIGS. 3A-3B illustrate example graphical user interfaces 300a-b showing a responsive webpage corresponding to a first responsive framework 302a and the responsive webpage corresponding to an agnostic framework 302b. The webpage design system described above in connection with FIG. 1 may provide the graphical user interfaces 300a-b, and in particular the graphical user interface 300b, to a user to assist the user in editing and modifying responsive webpages. For example, an application, such as the application described with respect to FIGS. 2A-2D may display the graphical user interface 300b.

As shown in FIG. 3A, the graphical user interface 300a includes file information 304, reference links 306, and tools 308. File information may indicate the number and names of files that are currently open for modification by a user in the webpage design system. For example, as shown, the webpage design system currently has two files opened, "index1.html" and "index2.html," where "index1.html" is the active file to which the webpage design system is giving focus. The reference links 306 can indicate source code locations that an active file references. The tools 308 can include various commands, settings, and/or preferences that a user can select and/or control. Selecting a tool 308 may initiate system-wide changes or may only apply a change to the active file. For example, as illustrated, the tools "Code," "Split," and "Live" allow a user to select the type of editing environment in which the active file should be shown.

In some example embodiments, the file information 304, reference links 306, and tools 308 are grouped into one or more toolbars. For example, as shown, the file information 304, reference links 306, and tools 308 are grouped into a single toolbar at the top of the graphical user interface 300a. Alternatively, the file information 304, reference links 306, and tools 308 may be separated into different toolbars and displayed in various locations across the graphical user interface 300a. Further, the toolbars may be moved, resized, and/or rotated according to user preference.

The graphical user interface 300a includes a responsive webpage corresponding to a first responsive framework 302a (or simply "first responsive webpage 302a") of the active file. The first responsive webpage 302a can include elements 310a-e, such as HTML elements. The elements 310a-e can include text boxes, graphics, grids with rows and columns, etc. Further, while the responsive webpage 302a shows a number of elements 310a-e, one will appreciate that the responsive webpage 302a can include additional elements, such as elements within elements and/or hidden elements. For example, element 310d may include separate elements for the text "Fully Responsive," for the computer graphic, and for the text under the graphic.

FIG. 3A shows a selected element 310e, where selection is indicated by the solid outline (and non-selected elements 310a-d are shown with dashed lines). For example, a user may select the element 310e to modify the element, such as to resize the element. As shown, editing tools 312a-c are provided upon selection of the element 310e. The editing tools 312a-c can allow a user to modify the element 310e by selecting one or more tools. For instance, selecting the editing tools 312a-b on the left and right of the selected element 310e will allow a user to resize the element according to the operations as long as the operations are supported by the first responsive framework. The editing tool 312c may include options such as hiding the selected element 310e, creating a new element layer, or deleting the selected element 310e.

In addition, the selected element 310e displays element information 314. As shown, the element information 314 includes an element division tag (e.g., "div") indicating that the selected element 310e is divided (i.e., separate) from other elements in the first responsive webpage 302a. The element information 314 includes a first responsive framework attribute 316. The element information 314 may also include properties of the selected element 310e. Further, as shown within the element information 314, an add element attribute option 318 may allow a user to add additional attributes to the selected element 310e.

As a note, the way the graphical user interface 300a displays attributes may be based on how the expressions and operations are defined in a responsive framework. Thus, if the expressions and operations are not uniform across responsive frameworks, then similar attributes may be displayed differently based on variations in the different responsive frameworks. If attributes and available operations display differently for responsive webpages that share the same type of element (but are based on different responsive frameworks), a user may be led to believe that either the elements are not the same type or that the operations perform different functions because the operations are labeled differently. Further, the user may become confused when the operation the user is looking for in connection with an element is not present in a responsive webpage the user is editing because the responsive webpage corresponds to a different responsive framework than a responsive framework with which the user is more familiar.

To illustrate, as shown in FIG. 3A, the first responsive framework attribute 316 displays a coded attribute (e.g., ".col-lg-5") in the element information 314. If a user is not familiar with the coding scheme of the first responsive framework, the user may have difficulty modifying the first responsive framework attribute 316 in the manner that the user prefers. In other words, while the user may be able to select and edit the first responsive framework attribute 316, the user may be confused by what edits are permitted by the first responsive framework and how changes to the first responsive framework attribute 316 will reflect in the first responsive webpage 302a.

To overcome this and other issues, the webpage design system may provide the first responsive webpage to the user based on an agnostic framework that is familiar to the user rather than based on the first responsive framework even if the responsive webpage corresponds to the first responsive framework. To illustrate, FIG. 3B illustrates a graphical user interface 300b that includes the same first responsive webpage corresponding to an agnostic framework 302b (or for purposes of explanation, "first agnostic responsive webpage 302b").

The first agnostic responsive webpage 302b includes many visual similarities to the first responsive webpage 302a shown in FIG. 3A. For example, as shown in FIG. 3B, the graphical user interface 300b displaying the first agnostic responsive webpage 302b includes file information 304, reference links 306, and tools 308 as well as elements 310a-e. Additionally, for the purpose of explanation and comparison, the same selected element (i.e., element 310e) is shown in FIG. 3B. As another similarity, the graphical user interface 300b may provide the same editing tools 312a-c as described above when the element 310e is selected in FIG. 3B.

While the first agnostic responsive webpage 302b includes visual similarities to the first responsive webpage 302a corresponding to a first responsive framework shown in FIG. 3A, the first agnostic responsive webpage 302b also includes visual differences. For example, in contrast to FIG. 3A, the element information 314 in FIG. 3B includes agnostic framework attributes 320a-b rather than first framework attributes. The agnostic framework attributes 320a-b are based on the expressions and operations of the agnostic framework rather than the expressions of the first responsive framework, or another responsive framework.

Because the webpage design system translates operations from a responsive framework into an agnostic framework, the agnostic framework attributes 320a-b may allow the user perform the same operations as if the users were editing the responsive webpage corresponding to a first responsive framework 302a. But by translating the first responsive framework into an agnostic framework, the webpage design system may provide the user with a simple and uniform experience, especially when the user is modifying multiple responsive webpages that each correspond to a different responsive framework.

To illustrate, the agnostic framework attributes 320a-b include the attributes ".column" and "large-5." While the user may initially be unfamiliar with what attributes modifications will modify the selected element 310e to yield the desired result, the user need only learn how to modify the agnostic framework attributes 320a-b under one framework (e.g., the agnostic framework) rather than under a number of different frameworks.

Figure 4A:
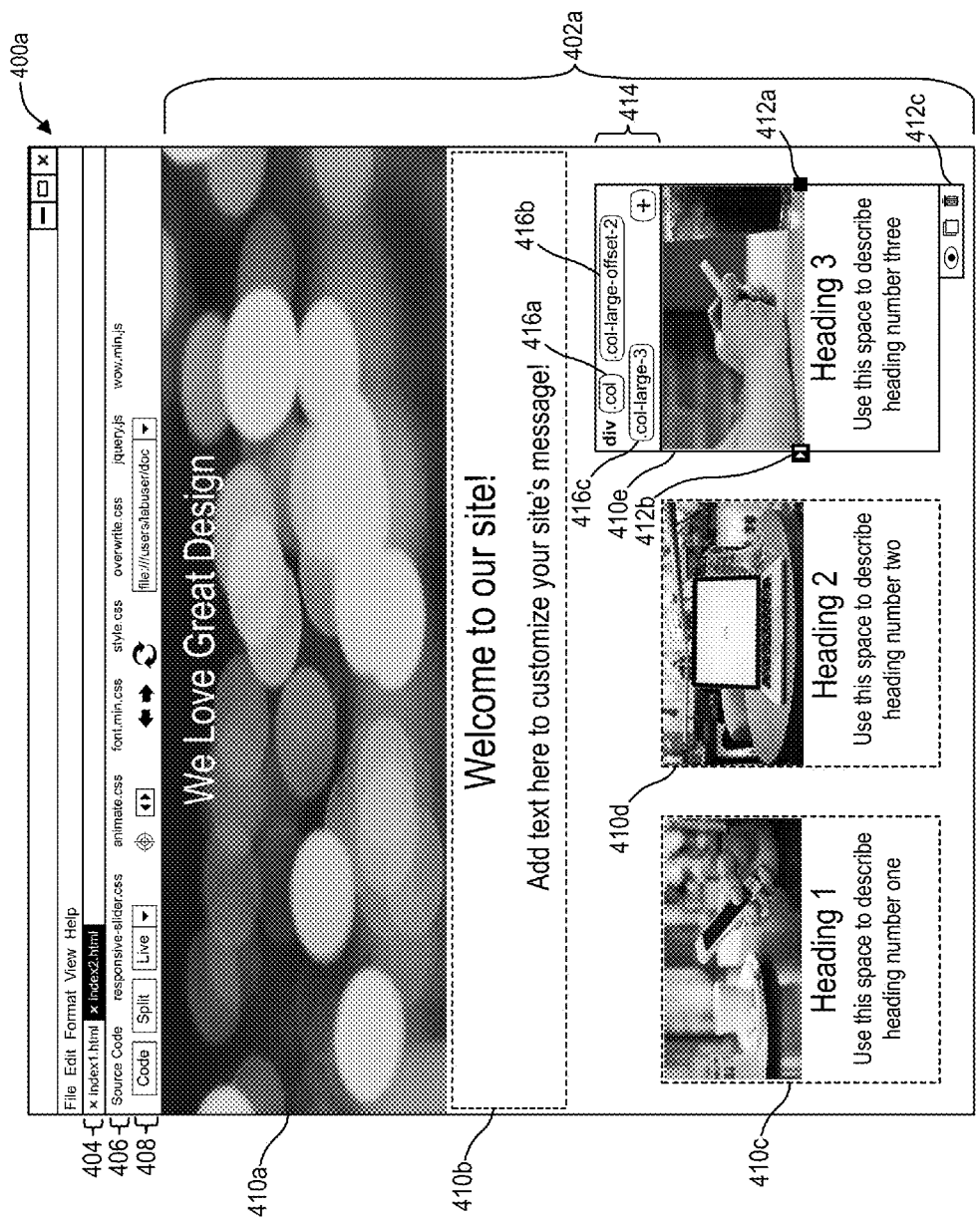
FIGS. 4A-4B illustrates example graphical user interfaces showing a second responsive webpage corresponding to a second responsive framework and the second responsive webpage corresponding to an agnostic framework in accordance with one or more embodiments.
Figure 4B:
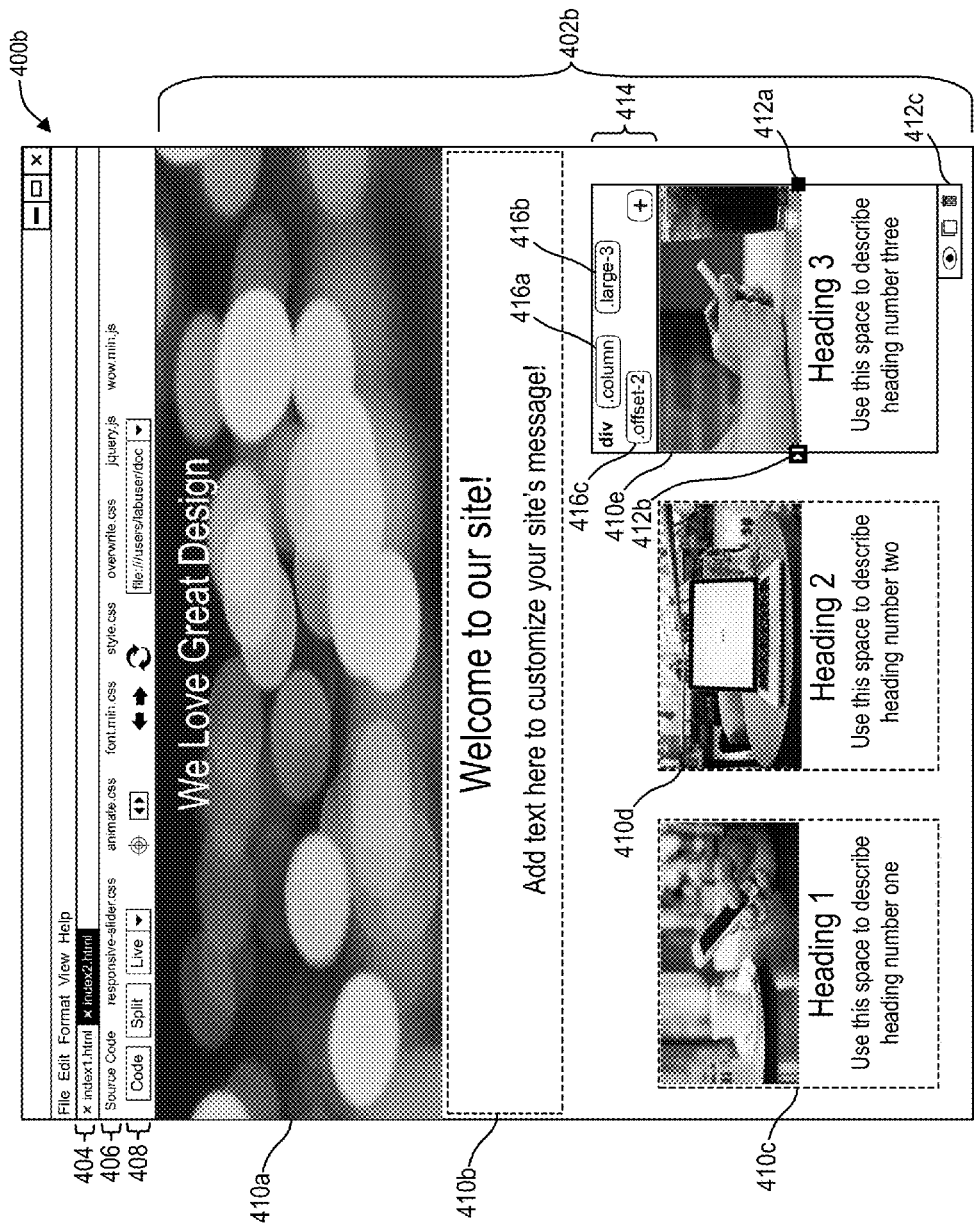

To better understand how the webpage design system provides a simple and uniform user experience, compare and contrast FIGS. 3A-3B with FIGS. 4A-4B. FIGS. 4A-4B illustrates example graphical user interfaces 400a-b showing a second responsive webpage corresponding to a second responsive framework 402a and the second responsive webpage corresponding to an agnostic framework 402b. The graphical user interfaces 300a-b described above in connection with FIGS. 3A-3B may also apply to FIGS. 4A-4B. For example, both the graphical user interfaces 400a-b of FIGS. 4A-4B include file information 404, reference links 406, tools 408, and elements 410a-e corresponding to the file information 304, reference links 306, tools 308, and elements 310a-e described above with respect to FIGS. 3A-3B.

Of note, the file information in the graphical user interfaces 400a-b of FIGS. 4A-4B illustrate that "index2.html" is displayed as the active file. Thus, in some example embodiments, the second responsive webpage corresponding to the second responsive framework 402a (or simply "second responsive webpage 402a") is opened on the same webpage design application as the first responsive webpage corresponding to the first responsive framework 302a described above in connection with FIG. 3A. Likewise, the first agnostic responsive webpage 302b described above in connection with FIG. 3B and the second responsive webpage corresponding to the agnostic framework 402a (or "second agnostic responsive webpage 402b") may both be open on the same webpage design application.

As shown in FIG. 4A and as mentioned above, the graphical user interface 402a displays the selected element 410e. In connection with the selected element 410e, the graphical user interface 402 displays editing tools 412a-c, element information 414, and the add element option 418, as described above. In particular, the element information 414 in FIG. 4A includes second responsive framework attributes 416a-c, such ".col," ".col-large-offset-2," and ".col-large-3." Comparing the first responsive framework attribute 316 in the first responsive webpage 302a of FIG. 3A to the second responsive framework attributes 416 in the second responsive webpage of FIG. 4A, one will notice apparent similarities between the labeling schemes of the attribute sets (e.g., ".col-lg-5" verses ".col,".col-large-3," and ".co,-large-offset-2"). Upon closer inspection, however, the labeling schemes are not the same. The differences between the attribute labeling schemes may arise because the element attribute of the selected element 310e in FIG. 3A is based on a first responsive framework and the element attributes of the selected element 410e in FIG. 4A are based on a second responsive framework. While the differences may be a matter of semantics, the differences may equally be a result of different defined operations between the two responsive frameworks.

By using an agnostic framework, the webpage design system may overcome the issues identified by comparing the graphical user interface 300a for the first responsive webpage 302a in FIG. 3A with the graphical user interface 400a for the second responsive webpage 402a in FIG. 4A. To illustrate, consider the differences between the graphical user interface 300b for the first agnostic responsive webpage 302b in FIG. 3B and the graphical user interface 400b for the second agnostic responsive webpage 402b in FIG. 4B. Of particular note, the style and syntax of the agnostic framework attributes 320a-b in FIG. 3B match the style and syntax of the agnostic framework attributes 420a-c in FIG. 4B. It should be noted that the agnostic framework attributes do not exactly match because the HTML elements to which the agnostic framework attributes correspond are different, however, the syntax of the agnostic framework attributes do match. Thus, as shown by comparing FIGS. 3B and 4B, while the responsive webpages of FIGS. 3B and 4B correspond to different responsive frameworks, by using an agnostic framework, the webpage design system is able to provide a user with a simple and unified experience irrespective of the responsive framework to which the responsive webpage corresponds.

Figure 5:
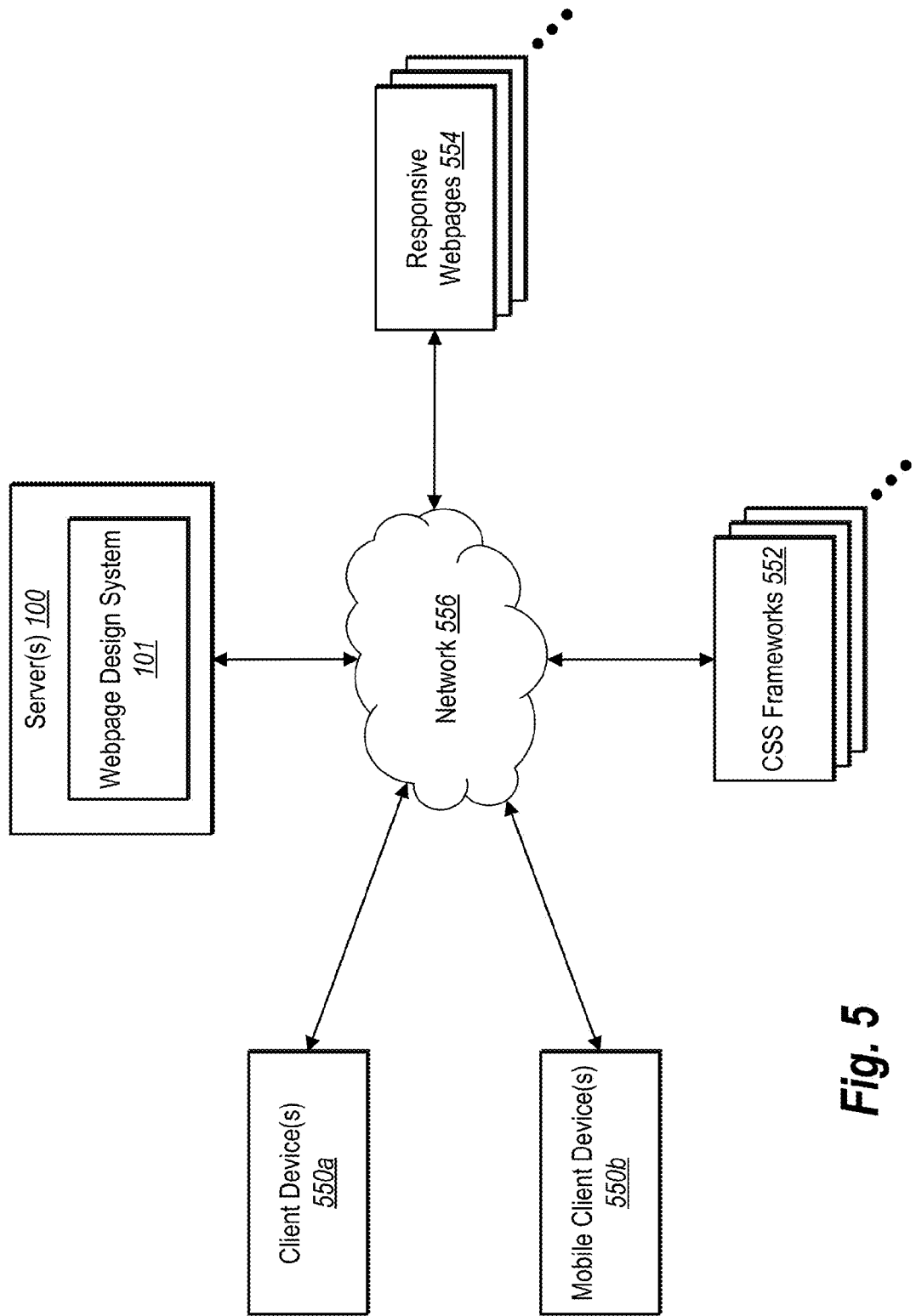
FIG. 5 illustrates a schematic diagram of an exemplary environment in which the webpage design system of FIG. 1 can operate in accordance with one or more embodiments.

FIG. 5 illustrates a schematic diagram of one embodiment of an exemplary environment 500 in which the webpage design system 101 of FIG. 1 can operate. In one or more embodiments, the exemplary environment 500 includes one or more server(s) 100 that include the webpage design system 101 connected to a device 550a (e.g., a non-mobile client device), a mobile client device 550b, one or more CSS frameworks 552, and one or more responsive webpages 554 via a network 556. Although the environment 500 of FIG. 5 is depicted as having various components, the environment 500 may have any number of additional or alternative components.

Further, while FIG. 5 illustrates a particular arrangement of the one or more server(s) 100 that include the webpage design system 101, the client device 550a, the mobile client device 550b, the CSS frameworks 552, the responsive webpages 554, and the network 508, various additional arrangements are possible. For instance, the one or more server(s) 100 that include the webpage design system 101 directly communicates with the CSS frameworks 552 and/or the responsive webpages 554, bypassing the network 556.

As mentioned, the one or more server(s) 100 that include the webpage design system 101, the client device 550a, the mobile client device 550b, the CSS frameworks 552, and the responsive webpages 554, may communicate via the network 556, which may include one or more networks and may use one or more communication platforms or technologies suitable for transmitting data and/or communication signals. Additional details relating to the network 556 are explained below with reference to FIG. 8.

As described above, one or more remote servers can host (e.g., store) the CSS frameworks 552. In some instances, multiple devices spread throughout the network 556 may store a copy of one or more frameworks of the CSS frameworks 552. Similarly, one or more servers can host the responsive webpages 554. In some additional embodiments, the client device 550a or the mobile client device 550b locally stores a responsive webpage or a copy of a responsive webpage.

One or more users may interface with the client device 550a and/or the mobile client device 550b. For example, a user may first use the client device 550a to access a responsive webpage. The same user may also use the mobile client device 550b to access the same responsive webpage. Alternatively, a different user may use the mobile client device 550b to access the same or a different responsive webpage. As used herein, a user may be an individual (i.e., human user), a business, a group, or other entity.

The client device 550*a* may represent various types of client devices. For example, in some embodiments, the client device 550*a* is a non-mobile device, such as a desktop or server, or another type of client device. The mobile client device 550*b* may be a mobile device, such as a mobile telephone, a smartphone, a PDA, a tablet, a laptop, a camera, a tracker, a watch, a wearable device, etc. Additional details with respect to the client device 550*a* and the mobile client device 550*b* are discussed below with respect to FIG. 8.

When a user views the same responsive webpage on the client device 550*a* and the mobile client device 500*b*, the client device 550*a* may display the responsive webpage differently from how the mobile client device 500*b* displays the responsive webpage. As described above, a responsive webpage may display differently on client devices based on the display capabilities each client device (e.g., determined through media queries and defined breakpoints). Thus, the format and the layout of a responsive webpage may cause the client device 550*a* to display the responsive webpage differently then the mobile client device 550*b* displays the same responsive webpage.

As described herein, a user may use the webpage design system 101 to modify one or more responsive webpages 554 corresponding to one or more CSS frameworks 552. The webpage design system 101 may provide the user with a simple and unified user-experience when modifying a responsive webpage by translating operations and expressions from a responsive framework into an agnostic framework and providing the agnostic framework to the user as part of the responsive webpage modification process.

In one or more embodiments, the webpage design system 101 provides sample views to a user as the user modifies a responsive webpage. For example, the webpage design system 101 may provide a user with a preview of how a responsive webpage will appear on a mobile device verses a non-mobile device. As another example, the webpage design system 101 can provide a user with live updates to a responsive webpage as the user modifies the responsive webpage via the webpage design system 101.

Figure 6:
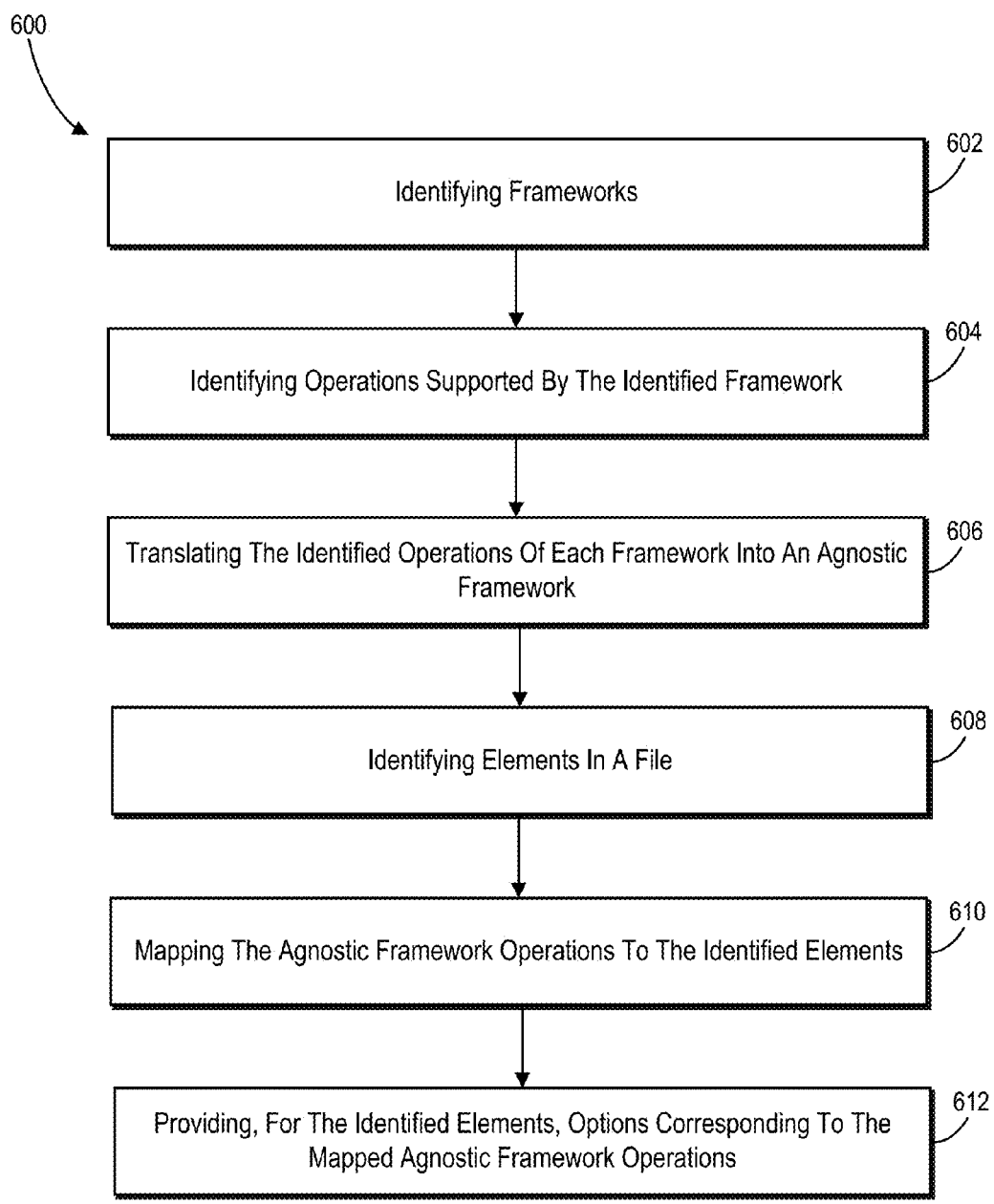
FIG. 6 illustrates a flowchart of a series of acts in a method for editing webpages of different responsive frameworks on an agnostic platform in accordance with one or more embodiments.

FIG. 6 illustrates a flowchart of a series of acts in a method 600 of editing webpages of different CSS frameworks on an agnostic platform in accordance with one or more embodiments disclosed herein. The method 600 includes an act 602 of identifying frameworks. In particular, the act 602 may involve identifying a plurality of frameworks 552. The act 602 may optionally involve identifying the plurality of frameworks 552 from a framework repository. In some example embodiments, the plurality of frameworks 552 may be a plurality of responsive frameworks, such as CSS responsive frameworks. Further, in one or more embodiments, a framework may include and/or define framework expressions and operations included in the framework.

The method also includes an act 604 of identifying operations supported by the identified frameworks. In particular, the act 604 may involve identifying, for each identified framework of the plurality of frameworks 552, operations supported by the framework. For example, the act 604 may involve parsing an identified framework to identify operations supported by the framework.

The method 600 further includes an act 606 of translating the identified operations of each framework into an agnostic framework. In particular, the act 606 may involve translating, for each identified framework of the plurality of frameworks 552, the identified operations into an agnostic framework. For example, the act 606 may include mapping one or more operations of the identified frameworks into one or more operations in an agnostic framework, in any suitable manner as described herein.

The method 600 also includes an act 608 of identifying elements in a file. In particular, the act 608 may involve identifying a plurality of elements in a first file. For instance, the act 608 can involve identifying a plurality of elements in a responsive webpage, where the elements are HTML elements and the file is an HTML responsive webpage. The act 608 can also involve parsing the first file to identify the plurality of elements. In some example embodiments, the method 600 can include an act of displaying the plurality of elements identified in the first file via an application.

In addition, the method 600 includes an act 610 of mapping the agnostic framework operations to the identified elements. In particular, the act 610 may involve mapping a first set of agnostic framework operations to one or more identified elements of the plurality of elements identified in the first file. In one or more embodiments, the act 610 can involve creating a user interface model that associates the operations from the agnostic framework with corresponding elements identified in the first file (e.g., responsive webpage).

The method 600 includes an act 612 of providing, for the identified elements, options corresponding to the mapped agnostic framework operations. In particular, the act 612 may involve providing, for the one or more identified elements in the first file, one or more options corresponding to the first set of mapped agnostic framework operations. The act 612 may optionally involve providing, to a user, the one or more options corresponding to an element upon detecting selection of the element.

The method 600 may further include an act of receiving, for a first element of the one or more elements identified in the first file, a selection of a first option of the one or more options corresponding to the first set of mapped agnostic framework operations, identifying a first mapped agnostic framework operation corresponding to the selected first option, translating the first mapped agnostic framework operation corresponding to the selected first option into a first framework option, and executing the first framework option on the first element in the first file.

Figure 7:
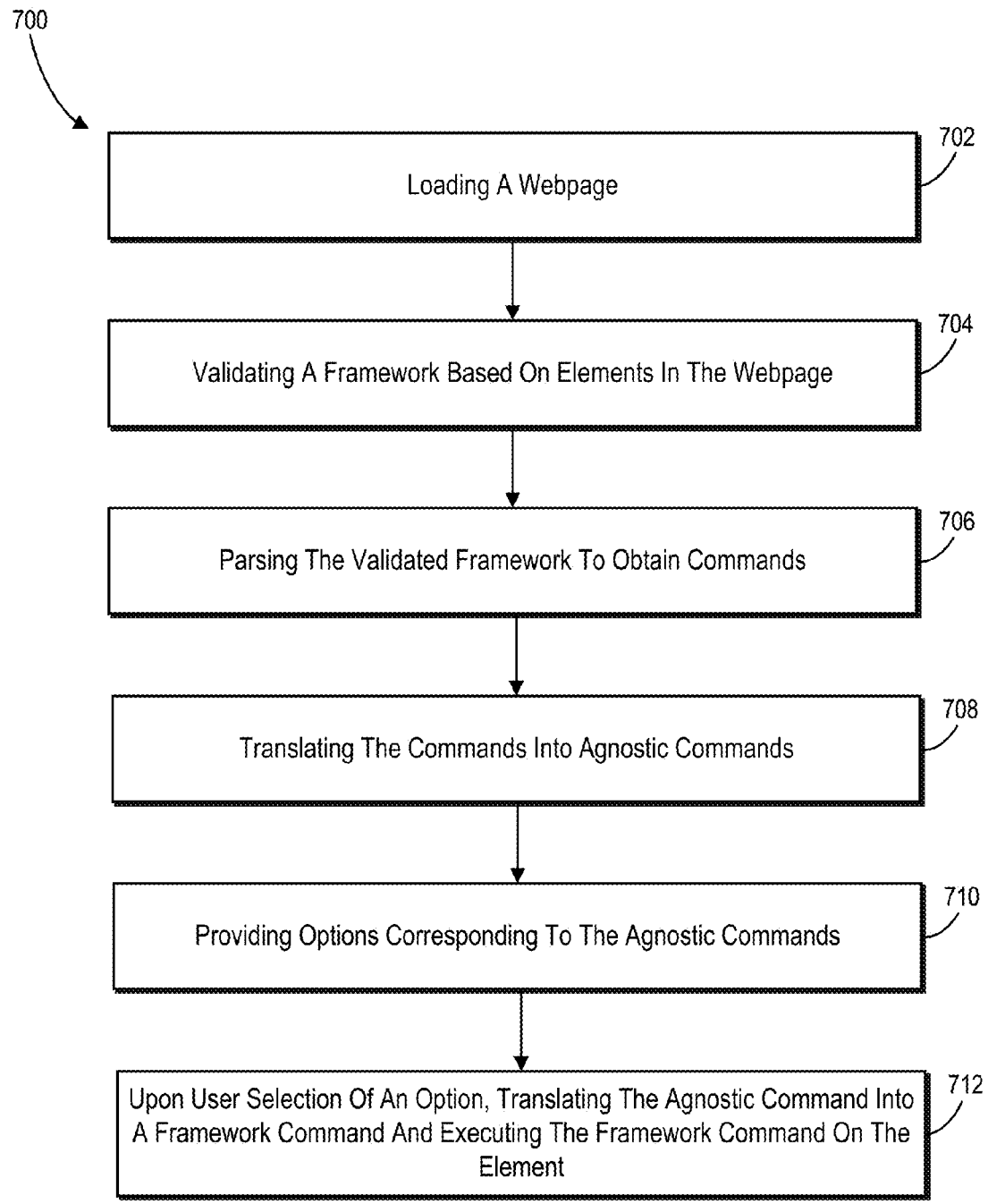
FIG. 7 illustrates a flowchart of a series of acts in a method for providing a unified user experience on an application in accordance with one or more embodiments.

FIG. 7 illustrates a flowchart of a series of acts in a method 700 of providing a unified user experience on an application in accordance with one or more embodiments described herein. The method 700 may correspond to a digital environment for providing a unified user experience on an application where the application includes the ability to edit and render webpages irrespective of the CSS framework used to create the webpages. To illustrate, the method 700 includes an act 702 of loading a webpage. In particular, the act 702 may involve loading, into an application, a webpage comprising a plurality of elements. In some example embodiments, the webpage may be a responsive webpage and the plurality of elements may be a plurality of HTML elements.

The method 700 also includes an act 704 of validating a framework 552 based on elements in the webpage. In particular, the act 704 may involve validating a framework 552 based on the plurality of elements in the loaded webpage. For example, the act 704 may involve identifying a framework from a plurality of frameworks that corresponds to the loaded webpage. Further, the act 704 may optionally involve finding commonalities between the plurality of elements in the webpage and a framework belonging to a plurality of frameworks 554.

The method 700 further includes an act 706 of parsing the validated framework to obtain commands. In particular, the act 706 may involve parsing the validated framework to obtain a plurality of commands defined by the validated framework. The method also includes an act 708 of translating the commands into agnostic commands. More specifically, the act 708 may involve translating the plurality of commands defined by the validated framework into framework agnostic schema commands.

In addition, the method 700 includes an act 710 of providing options corresponding to the agnostic commands. In particular, the act 710 includes providing, for one or more identified elements of the plurality of elements in the loaded webpage, one or more options corresponding to one or more framework agnostic schema commands of the framework agnostic schema commands. In some example embodiments, the method 700 may also include receiving, from a user, selection of the option of the one or more options corresponding to one or more framework agnostic schema commands in connection with the element of the one or more identified elements.

Upon user selection of an option, the method 700 includes an act 712 of translating the agnostic command into a framework command and executing the framework command on the element. In particular, upon a user selecting an option of the one or more options for an element of the one or more identified elements, the act 712 may involve translating the framework agnostic schema command corresponding to the selected option into a validated framework command and executing the validated framework command on the element within the webpage. The act 712 may also involve generating framework-specific code corresponding to the selected element and applying the generated framework-specific code to the webpage.

In one or more additional embodiments, the method 700 may include an act of updating a display of the webpage on the application to reflect the executed validated framework command on the element within the webpage. Further, the method may include an act of identifying a number of breakpoints in the webpage and displaying, via the application, the webpage in a grid model based on the number of identified breakpoints. In some example embodiments, the method 700 may include an act of extracting CSS classes from the validated framework and displaying, via the application, the webpage as defined by the CSS classes extracted from the framework.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
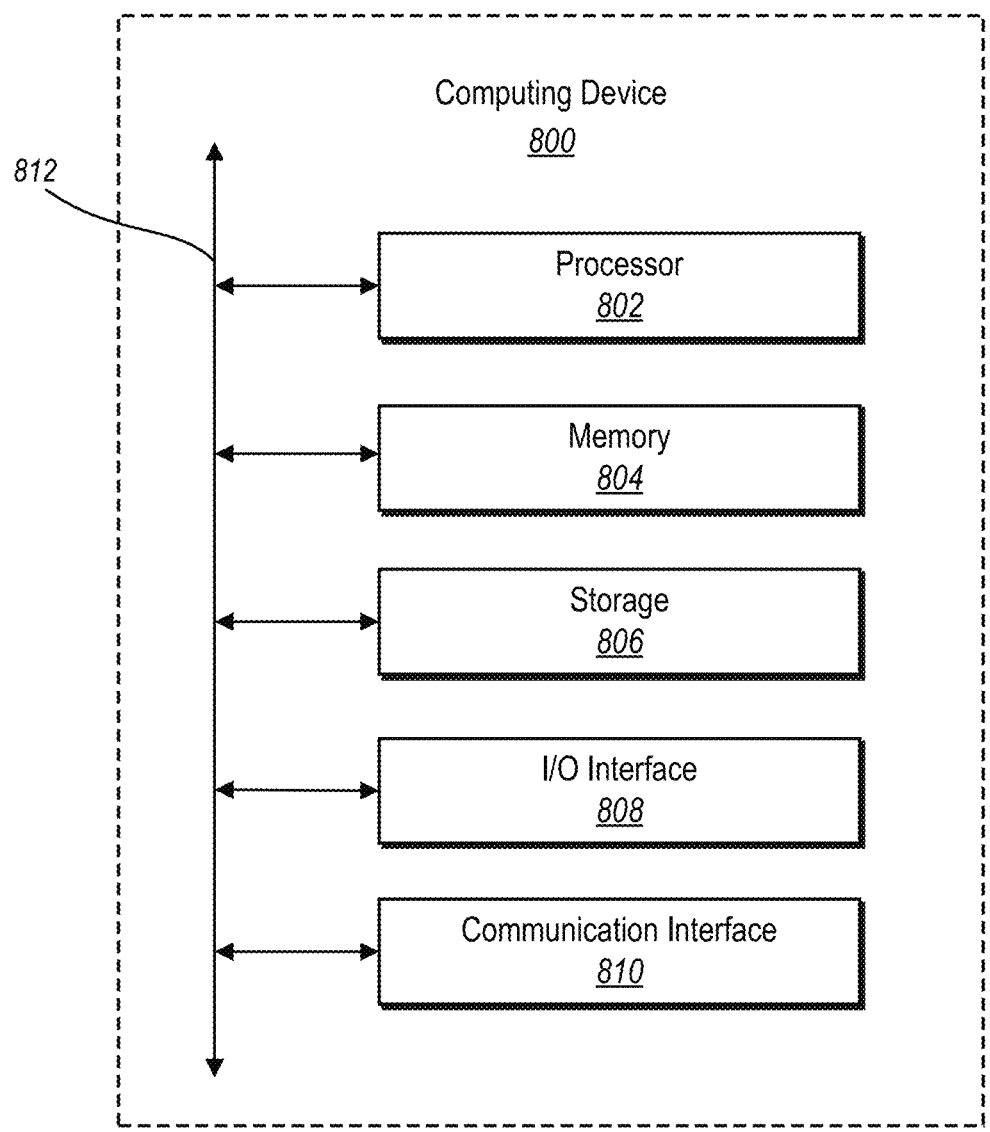
FIG. 8 illustrates a block diagram of an exemplary computing device in accordance with one or more embodiments.

FIG. 8 illustrates a block diagram of an exemplary computing device 800 that may be configured to perform one or more of the processes described above. One will appreciate that one or more computing devices, such as the computing device 800 may implement the one or more servers 100, 500 described with respect to FIG. 1 and FIG. 5. As shown by FIG. 8, the computing device 800 can comprise a processor 802, memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In particular embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In particular embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, the storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In particular embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from the computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications via various communication protocols. Examples of communication protocols that may be used include, but are not limited to, data transmission media, communication devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communication networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

I claim:

1. A computer-implemented method for editing webpages of different frameworks on an agnostic platform, the method comprising:
   identifying a plurality of frameworks;
   identifying, for each identified framework of the plurality of frameworks, operations supported by the framework;
   translating, for each identified framework of the plurality of frameworks, the identified operations into an agnostic framework to obtain agnostic framework operations, wherein each agnostic framework operation comprises a uniform operation that corresponds to one or more identified operations from the plurality of frameworks;
   identifying a plurality of elements in a first file;
   mapping a first set of agnostic framework operations from the agnostic framework operations to one or more identified elements of the plurality of elements identified in the first file; and
   providing, for the one or more identified elements in the first file, one or more options corresponding to the first set of mapped agnostic framework operations.

2. The method of claim 1, further comprising:
   receiving, for a first element of the one or more elements identified in the first file, a selection of a first option of the one or more options corresponding to the first set of mapped agnostic framework operations;
   identifying a first mapped agnostic framework operation corresponding to the selected first option;
   translating the first mapped agnostic framework operation corresponding to the selected first option into a first framework option; and
   executing the first framework option on the first element in the first file.

3. The method of claim 1, wherein the plurality of identified frameworks comprises a plurality of CSS responsive frameworks.

4. The method of claim 1, wherein each identified framework of the plurality of frameworks defines one or more operations supported by the identified framework.

5. The method of claim 1, further comprising displaying the plurality of elements identified in the first file via an application for editing web pages independent of an underlying framework.

6. The method of claim 2, further comprising:
   identifying a plurality of elements in a second file;
   mapping a second set of agnostic framework operations to one or more identified elements of the plurality of elements identified in the second file; and
   providing, for the one or more identified elements in the second file, one or more options corresponding to the second set of mapped agnostic framework operations.

7. The method of claim 6, further comprising:
   receiving, for a second element of the one or more elements identified in the second file, a selection of a second option of the one or more options corresponding to the second set of mapped agnostic framework operations;
   identifying a second mapped agnostic framework operation corresponding to the selected second option;
   translating the second mapped agnostic framework operation corresponding to the selected second option into a second framework option; and
   executing the second framework option on the second element within the second file.

8. The method of claim 7, wherein the first mapped agnostic framework operation and the second mapped agnostic framework operation are equivalent o perations from different identified frameworks of the plurality of frameworks.

9. The method of claim 8, wherein the first mapped agnostic framework operation and the second mapped agnostic framework operation are displayed to a user as a common agnostic framework schema operation.

10. The method of claim 1, wherein the first file comprises a responsive webpage.

11. The method of claim 1, wherein the agnostic framework comprises an XML framework file that comprises:
   expressions that describe an identified framework;
   operations that are supported by the identified framework; and
   expressions that identify HTML elements on which operations are permitted using the identified framework.

12. A non-transitory computer-readable medium comprising instructions to edit and render webpages irrespective of a CSS framework used to create the webpages, that when executed by one or more processors, cause a computing device to:
   load, into an application, a webpage comprising a plurality of elements;
   validate a framework based on the plurality of elements in the loaded webpage;
   parse the validated framework to obtain a plurality of commands defined by the validated framework;
   translate the plurality of commands defined by the validated framework into framework agnostic schema commands, wherein each framework agnostic schema command of the framework agnostic schema commands comprises a uniform command that corresponds to one or more commands from one or more frameworks;
   provide, for one or more identified elements of the plurality of elements in the loaded webpage, one or more options corresponding to one or more framework agnostic schema commands of the framework agnostic schema commands; and
   upon a user selecting an option of the one or more options for an element of the one or more identified elements:
      translate the framework agnostic schema command corresponding to the selected option into a validated framework command; and
      execute the validated framework command on the element within the webpage.

13. The non-transitory computer-readable medium of claim 12, wherein the agnostic framework comprises an XML framework file that comprises: expressions that describe an identified framework; operations that are supported by the identified framework; and expressions that identify HTML elements on which operations are permitted using the identified framework.

14. The non-transitory computer-readable medium of claim 12, wherein the instructions, when executed by the one or more processors, cause the computing device to execute the validated framework command on the element within the webpage by generating framework-specific code corresponding to the selected element and applying the generated framework-specific code to the webpage.

15. The non-transitory computer-readable medium of claim 12, further comprising instructions, when executed by the one or more processors, cause the computing device to update a display of the webpage on the application to reflect the executed validated framework command on the element within the webpage.

16. The non-transitory computer-readable medium of claim 12, further comprising instructions, when executed by the one or more processors, cause the computing device to:
   identify a number of breakpoints in the webpage; and
   display, via the application, the webpage in a grid model based on the number of identified breakpoints.

17. The non-transitory computer-readable medium of claim 12, wherein the instructions, when executed by the one or more processors, cause the computing device to validate the framework based on the plurality of elements in the loaded webpage by finding commonalities between the plurality of elements in the webpage and a framework belonging to a plurality of frameworks.

18. The non-transitory computer-readable medium of claim 12, wherein the plurality of elements comprises a plurality of HTML elements.

19. The non-transitory computer-readable medium of claim 12, further comprising instructions, when executed by the one or more processors, cause the computing device to:
   extract CSS classes from the validated framework; and
   display, via the application, the webpage as defined by the CSS classes extracted from the framework.

20. A system for editing webpages of different CSS frameworks on an agnostic platform comprising:
   at least one processor;
   at least one non-transitory computer readable storage medium storing instructions thereon, that, when executed by the at least one processor, cause the system to:
      identify a plurality of frameworks;
      identify, for each identified framework of the plurality of frameworks, operations supported by the framework;
      translate, for each identified framework of the plurality of frameworks, the identified operations into a framework agnostic schema to obtain agnostic framework operations, wherein each agnostic framework operation comprises a uniform operation that corresponds to one or more identified operations from the plurality of frameworks;
      identify a plurality of elements in a first file;
      map a first set of framework agnostic schema operations from the agnostic framework operations to one or more identified elements of the plurality of elements identified in the first file; and
      provide, for the one or more identified elements in the first file, one or more options corresponding to the first set of mapped framework agnostic schema operations.

* * * * *